United States Patent
Yamada et al.

(10) Patent No.: US 6,609,273 B1
(45) Date of Patent: Aug. 26, 2003

(54) HINGE

(75) Inventors: Akira Yamada, Tokyo (JP); Yutaka Yoshigashima, Tokyo (JP)

(73) Assignee: Yamamoto Precision Co., Ltd. (JP)

(*) Notice: Subject to any disclaimer, the term of this patent is extended or adjusted under 35 U.S.C. 154(b) by 0 days.

(21) Appl. No.: 09/937,305

(22) PCT Filed: Jun. 16, 2000

(86) PCT No.: PCT/JP00/03962

§ 371 (c)(1),
(2), (4) Date: Apr. 14, 2002

(87) PCT Pub. No.: WO01/57407

PCT Pub. Date: Aug. 9, 2001

(30) Foreign Application Priority Data

Jan. 31, 2000 (JP) .................................. 2000-023146
Mar. 31, 2000 (JP) .................................. 2000-100010

(51) Int. Cl.[7] .............................................. E05D 11/10
(52) U.S. Cl. ........................... 16/332; 16/342; 16/386; 379/433.13
(58) Field of Search .......................... 16/332, 327, 334, 16/342, 344, 345, 348, 357, 386, 359; 40/530, 532; 379/433.13

(56) References Cited

U.S. PATENT DOCUMENTS

| | | | | | |
|---|---|---|---|---|---|
| 2,591,476 | A | * | 4/1952 | Swanson | 16/54 |
| 3,583,734 | A | * | 6/1971 | Magi | 403/96 |
| 4,987,640 | A | * | 1/1991 | Lin | 16/327 |
| 5,409,297 | A | * | 4/1995 | De Filippo | 297/411.32 |
| 5,412,842 | A | * | 5/1995 | Riblett | 16/334 |
| 5,454,617 | A | * | 10/1995 | Welter | 296/97.9 |
| 5,509,332 | A | | 4/1996 | Donaldson | 81/59.1 |
| 5,636,462 | A | * | 6/1997 | Kleiman | 40/452 |
| 5,645,308 | A | * | 7/1997 | Fink | 296/97.9 |
| 5,765,263 | A | * | 6/1998 | Bolinas et al. | 16/342 |
| 5,918,347 | A | * | 7/1999 | Morawetz | 16/322 |

FOREIGN PATENT DOCUMENTS

| | | |
|---|---|---|
| JP | 57-194856 | 6/1936 |
| JP | 51-17655 | 7/1949 |
| JP | 44-19217 | 8/1969 |
| JP | 48-7131 | 1/1973 |
| JP | 61-38319 | 3/1986 |
| JP | 1-90641 | 6/1989 |
| JP | 1-120572 | 8/1989 |
| JP | 4-75234 | 6/1992 |
| JP | 6-296517 | 10/1994 |
| JP | 7-19257 | 1/1995 |
| JP | 07-212051 | 8/1995 |
| JP | 08-126050 | 5/1996 |
| JP | 11-68901 | 3/1999 |
| JP | 11-230153 | 8/1999 |
| JP | 11-351237 | 12/1999 |
| JP | 2000-165494 | 6/2000 |

* cited by examiner

Primary Examiner—Gary Estremsky
Assistant Examiner—Mark Williams
(74) Attorney, Agent, or Firm—Lorusso, Loud & Kelly

(57) ABSTRACT

The present invention relates to a hinge providing a specified braking force against pivotal motion between two hinged flaps. The hinge includes a bearing body, which has, at its exterior, mountings for a first flap and also a wear-resistant inner surface having slider catches at positions spaced by a specified angle on the same circumference of the inner surface. The hinge also has a shaft with a mounting at one end for a second flap. The shaft is mounted in the bearing body in a manner allowing relative turning, and also has a spring housing hole opening at its outer surface along an axis crossing at a right angle with its longitudinal axis. While turning, a coil spring, which is inserted into the spring housing hole, biases a slider radially outward from the spring housing hole.

7 Claims, 14 Drawing Sheets

HINGE

CROSS-REFERENCE TO RELATED APPLICATION

This application is a 371 of PCT/JP00/03962 filed Jun. 16, 2000 and claims priority of Japanese Application Number 2000-23146 filed Jan. 31, 2000 and Japanese Application Number 2000-100010 filed Mar. 31, 2000.

TECHNICAL FIELD

This invention generally relates to a hinge.

More specifically, the present invention relates to a hinge having the functions of (1) providing a specified braking force in pivot unfolding or folding of two flaps by which, when the flaps are pivotally folded or unfolded to a specified angle or are folded over each other, "click" to a stop of their pivotal motion, and (2) allowing for application of a specified force in the direction of pivotal motion to release the flaps from their "clicked" state. Such a hinge may be used for connecting together a transmitter-side casing and a receiver-side casing of a folding portable mobile telephone, for example.

BACKGROUND ART

A portable mobile telephone as shown in FIG. 14 is disclosed in Japanese Patent Laid-open No. 11-68901, and a hinge as shown in FIG. 15 is used for this portable mobile telephone. The portable mobile telephone shown in FIG. 14 is composed of a transmitter-side casing 50 having a transmitter part 51 and operation keys 52 and a receiver-side casing 60 having a receiver part 61, a display part 62 and an antenna 63. The casings 50 and 60 are connected together through a pair of hinges 7, 7.

Each hinge 7 has axially aligned cylindrical conductive bearing parts 70, 71, and one bearing part 70 is connected to the transmitter-side casing 50, while the other bearing part 71 is connected to the receiver-side casing 60. Reference numeral 73 denotes a connector cover.

A ring-like friction-bearing member 72 made of metal is fixed to the inside of the bearing part 71, as shown in FIG. 15. This friction-bearing member 72 is in contact with an end of a cylindrical friction member 73 made of metal and mounted in the bearing part 70.

A shaft 74 has a flanged spring seat 74a, also serving as a cover, at its base end and a bolt part 74b extending therefrom through the bearing parts 70, 71. A spring 75 bears against the base end of the shaft 74. The spring 75 is compressed by tightening the bolt part 74b of the shaft 74 with a nut 76 which extends through an open end of the other bearing part 71 to press the friction member 73 against the friction-bearing member 72 for braking.

Reference numeral 77 denotes a cylindrical flat spring also serving as a spring seat. The tip end of the flat spring 77 is in slidable contact with the outer surface of the friction member 73 and with the inner surface of the bearing part 70, providing conduction of frame grounding in the casing.

In the above-described hinge, the friction-bearing member 72 and the friction member 73 are held in surface contact with each other under a specified pressure by the action of the spring 75. Thus, the casing 60, when folded over or unfolded from the casing 50, is braked by a specified force through friction between the friction-bearing member 72 and the friction member 73.

Further, the sliding surfaces of the friction-bearing member 72 and the friction member 73 have parts with tapered surfaces at positions spaced at an interval of a specified angle (160 to 180 degrees). Thus, when the casings 50, 60 are pivoted open to a specified angle, the tapered parts engage with each other for locking or "clicking" the casings. Forcing the casing 50 pivotally relative to the casing 60 releases the casings from their "clicked state" for folding the casings over each other (closed). Then, the tapered parts again become engaged with each other when the casings are folded closed.

Since the hinge in the above prior art utilizes the pressure of the spring 75 in the axial direction, the contact between the friction-bearing member 72 and the friction member 73 in the turning direction is structurally limited to a short length, resulting in the need for a larger-sized spring to provide sufficient braking force against pivotal motion. However, since the bearing 70 has an outer diameter of 7 mm or less in most cases, a large-sized spring can not be used for the above hinge.

Although an increased number of springs is supposed to meet a demand for higher braking force, the structure of the above hinge does not allow for mounting a plurality of springs (two springs, for instance).

DISCLOSURE OF THE INVENTION

Accordingly, it is an object of the present invention to provide a hinge, which utilizes the pressure of a spring in the direction of pivotal motion of the flaps more efficiently by increasing the contact length of frictional parts.

A hinge according to the present invention comprises a bearing body, which has, at its exterior, mounting parts for a first flap and a wear-resistant inner surface having slider holding parts ("catches") at positions spaced at an interval of a specified angle on the same circumference. A shaft has, at its one end, mounting parts for a second flap, and is inserted into the bearing body in a manner allowing relative turning. The shaft also has a spring housing hole opening at one end at the shaft's outer surface so as to cross at right angles with a longitudinal axis. A coil spring is inserted into the spring housing hole and a slider is biased by the coil spring so as to be pressed against the inner surface of the bearing body. The slider has wear-resistance at least at its tip end which contacts with the inner surface of the bearing body, and is capable of engagement with and disengagement from the slider holding part (slider catch) when the bearing body is turned relative to the shaft.

The slider may have a spring guide pin for mounting the coil spring externally fitted to the guide pin. Optionally, the slider may be in the form of a hard ball or a hard roller having its axis parallel to an axis of the shaft.

In a preferred embodiment the slider has a semicircular section orthogonal to the axis of the tip end making contact with the inner surface of the bearing body, and makes contact with the inner surface portions of the bearing body, other than the slider catches continuously over a specified axial length.

The surface portions of the slider in contact with the coil spring are preferably planar.

In a preferred embodiment, the slider holding part or catch is in the form of a hole.

A plurality of paired slider catches may be located in the same circumferential location, and a plurality of spring housing holes axially paired so as to face corresponding slider catches, and with coil spring and a slider housed in each spring housing hole.

The slider catch may be formed in the shape of an axial groove on the inner surface of the bearing body and may have a concave semicircular section.

Where the slider holding part is formed as a groove having a concave semicircular section, with a plurality of spring housing holes axially aligned so as to face in the same circumferential direction and a coil spring housed in each spring housing hole, the slider should have an axial length extending across the spring housing holes, and the spring housing holes are recessed to such an extent that the tip end of the slider is hidden when in contact with a part of the bearing body other than a slider catch.

The bearing body may be composed of a synthetic resin body and a metal interior sheet fixed to the inner surface of the resin body.

A transmitter-side casing of a portable mobile telephone may be attached to one of the first and second flaps, while a receiver-side casing of the portable mobile telephone is attached to the other, in which application the bearing body and the shaft should have conductivity.

BEST MODE OF EMBODYING THE INVENTION

Figure 1:
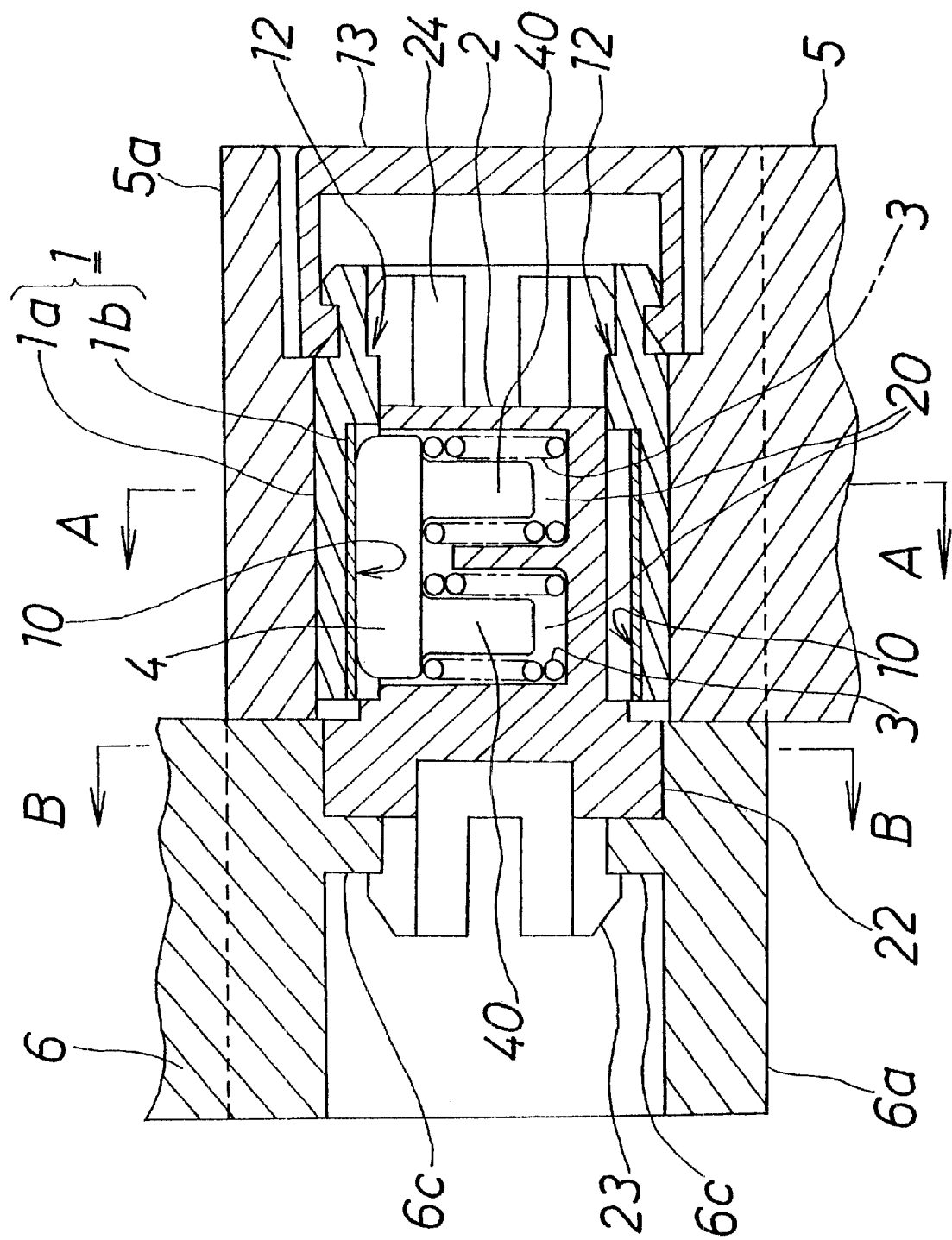
FIG. 1 is a sectional view showing a hinge of a first embodiment of the present invention.

Preferred embodiments of the present invention will be described hereinafter with reference to the accompanying drawings.

First Embodiment

In FIGS. 1 to 4, reference numeral 1 denotes a bearing body having, at its outer surface, mounting grooves 11 for a first flap body 5, and the bearing body 1 is formed in a cylindrical shape as a whole and is conductive. The bearing body 1 has a wear-resistant inner surface, and an inner surface part of the bearing body 1 has slider holding means or catches in the form of axial grooves 10, 10 having a concave semicircular section and spaced apart a specified angle (180 degrees in this embodiment) on the same circumference.

The bearing body 1 includes a body portion 1a made of hard synthetic resin, such as polyacetal having conductivity and an interior metal cylinder 1b fixed to the inner surface of the body portion 1a. The interior sheet 1b has the slider holding grooves 10, 10 at symmetrical positions, while the inner surface of the body portion 1a has grooves 10a, 10a (See FIG. 4), in which the slider holding grooves 10, 10 (catches) are fitted. The interior sheet 1b is thin stainless steel formed by drawing into a cylindrical shape with a progressive press.

Figure 2:
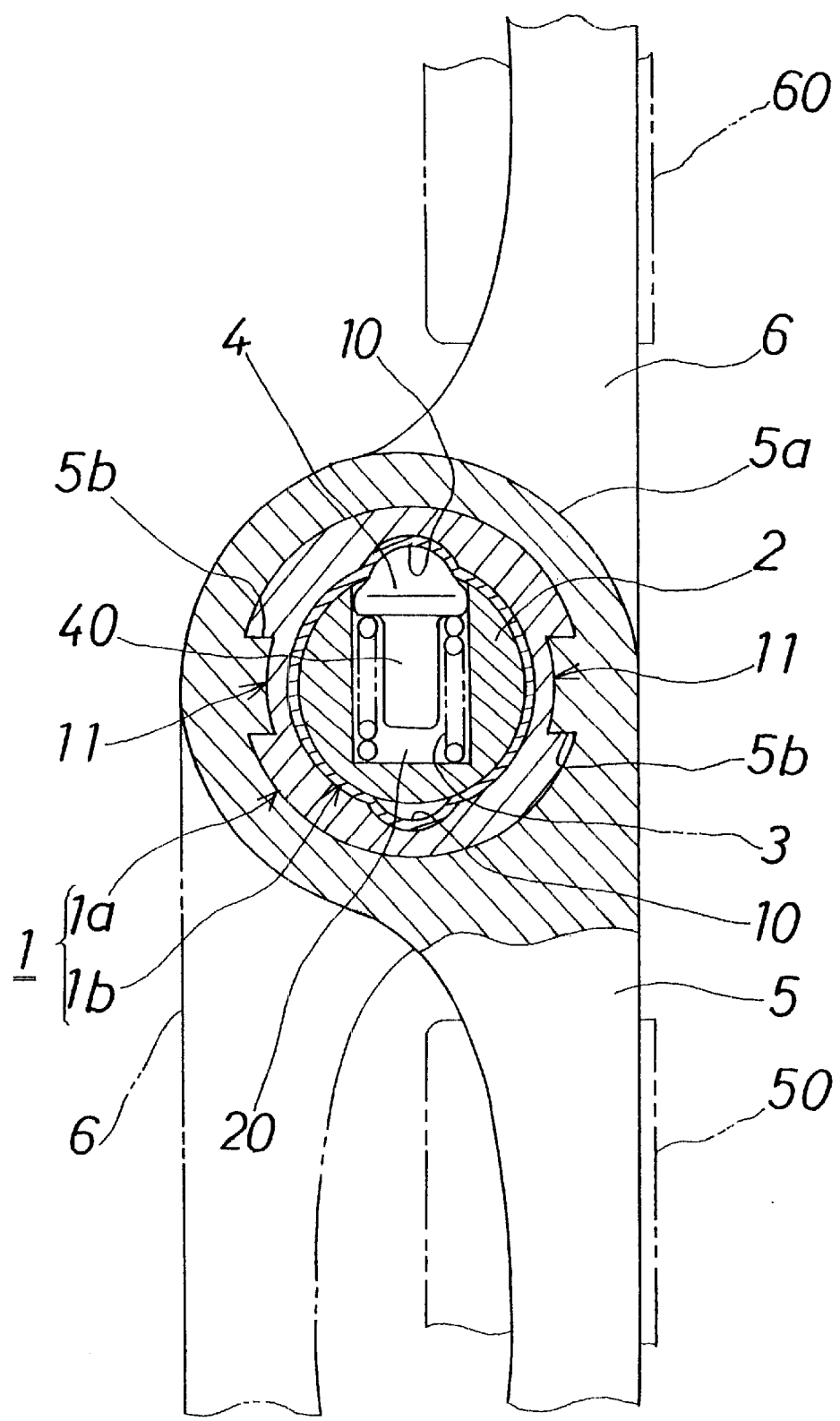
FIG. 2 is a sectional view taken along line A—A in FIG. 1.
Figure 4:
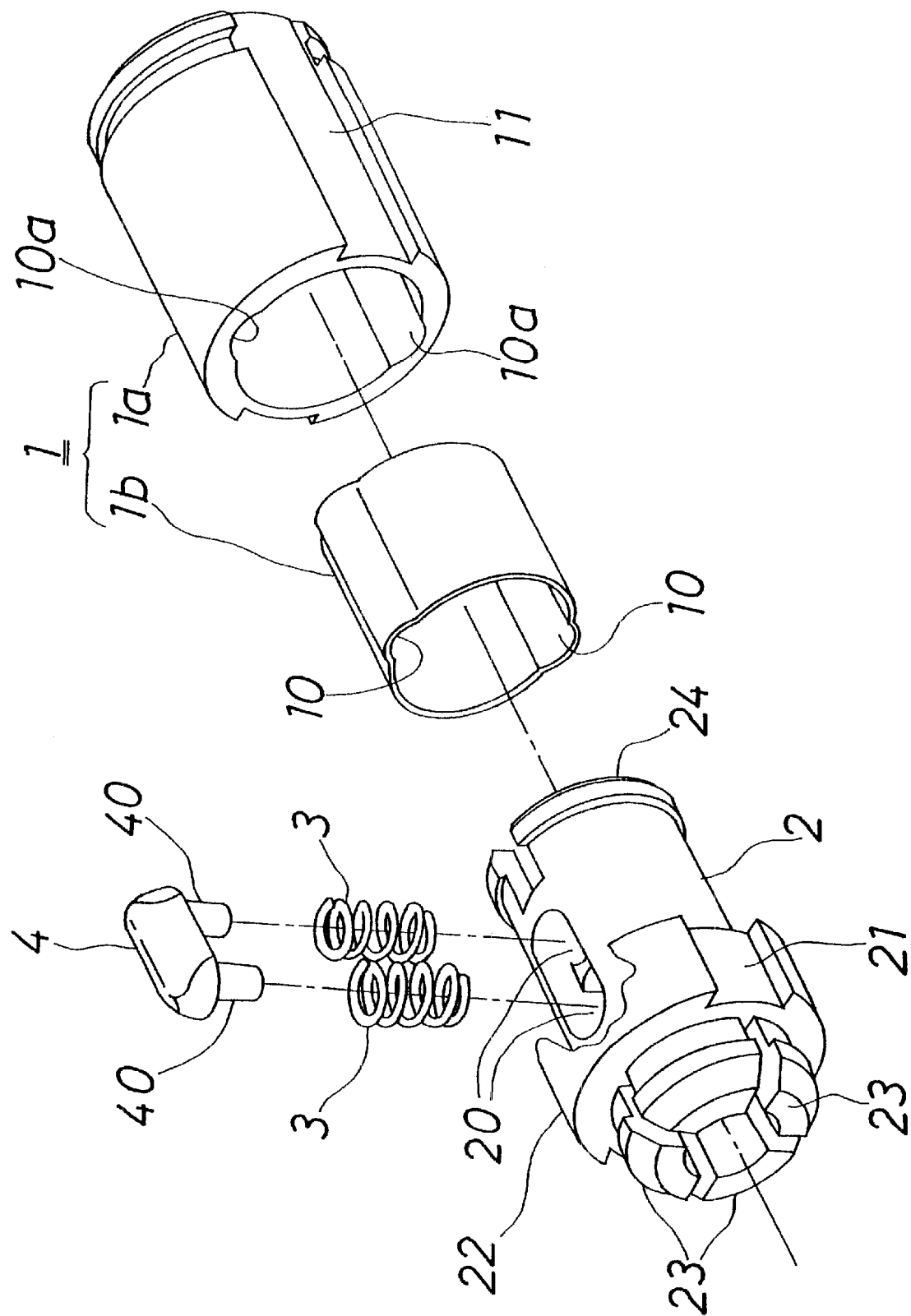
FIG. 4 is an exploded perspective view showing an essential part of the hinge in FIG. 1.

As shown in FIGS. 2 and 4, mounting grooves 11, each in the shape of an axial groove, are provided on the outer surface of the bearing body 1. The bearing body 1 and the first flap 5 turn together because of axial projections 5b, formed on the inner surface part of a cylindrical part 5a of the first flap 5 as shown in FIG. 2, fitted into the mounting grooves 11.

Shaft 2 is made of hard synthetic resin such as polyacetal having conductivity. One end of the shaft 2 has a flange 22, and a shaft portion is inserted into the bearing body 1 for turning relative thereto.

In the first embodiment, the end of the shaft 2 has a holding projection 24 circumferentially divided into four parts by axial slots for mounting the shaft 2 to the bearing body 1 by press-fitting the holding projection 24 into the bearing body 1 whereby the holding projection 24 engages a circumferential step 12 (See FIG. 1) formed at the end of the bearing body 1.

Figure 3:
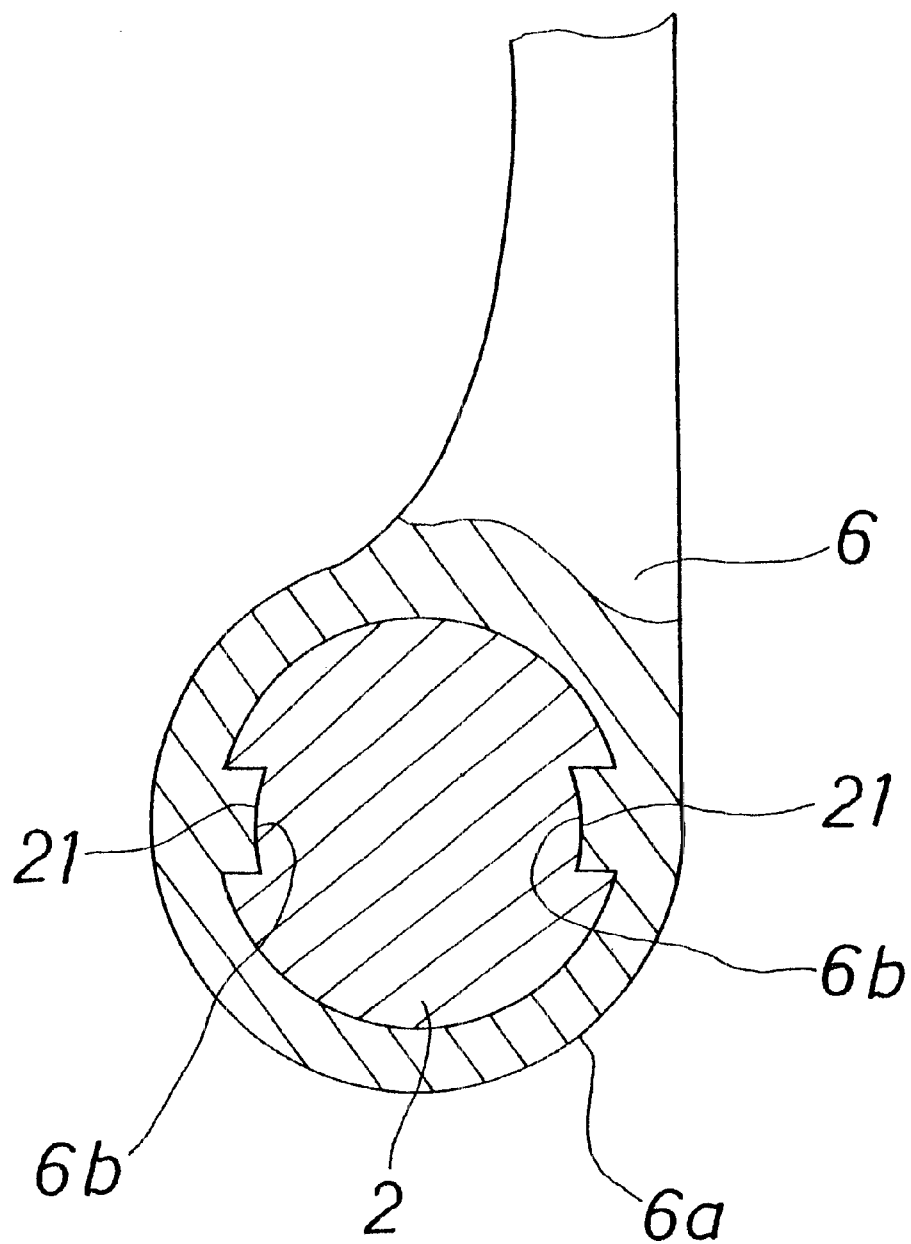
FIG. 3 is a sectional view taken along line B—B in FIG. 1.

The flange 22 of the shaft 2 has mounting grooves 21 for receiving a second flap body 6. As shown in FIGS. 3 and 4, each mounting groove 21 extends axially on the flange 22. The shaft 2 and the second flap body 6 are locked for turning together by engaging fitting projections 6b formed on the inner surface of a cylindrical part 6a of the second flap body 6 in the mounting grooves 21.

The surface of the flange 22 opposite shaft 2 has a holding projection 23 divided into four parts by axial slots for mounting the shaft 2 to the cylindrical part 6a of the second flap 6 by engaging holding the holding projection 23 with a circumferential inner flange 6c formed on the cylindrical part 6a of the second flap 6, as shown in FIG. 1.

Reference numeral 13 denotes a cap made of synthetic resin, and this cap 13 is fitted over the outside end of the bearing body 1.

The shaft 2 inserted into the bearing body 1 has a spring housing hole 20, opening at one end radially outward in the circumferential direction so as to cross at a right angle with the shaft axis. The spring housing holes 20 are formed in two parallel and axially spaced locations corresponding to the slider catches 10. A coil spring 3 (a piano wire is used in this embodiment) is housed in each spring housing hole 20. These coil springs 3 bias a slider 4 made of wear-resistant metal outward of the spring housing holes 20.

The rounded surface of the slider 4 making contact with the inner surface of the bearing body 1 has a semi-circular section orthogonal to the axial direction and is designed to make contact with the inner surface of the bearing body 1 continuously over a specified length in the axial direction. A planar surface of the slider 4 is in contact with the coil springs 3, and a pair of pins 40, 40 for guiding the coil springs 3 are formed integral with the planar surface.

Since the slider 4 has an axial length sufficient to extend across the two spring housing holes 20, the spring housing holes 20 are recessed to such an extent that the tip of the slider 4 is hidden when in contact with a portion of the bearing body 1 other than the slider catches 10.

The material of the slider 4 may be chrome-molybdenum steel or nickel-chromemolybdenum steel, and is formed by a metal injection molding process (MIM).

Two sets of hinges according to the first embodiment are required for a folding portable mobile telephone. A transmitter-side casing 50 of the portable mobile telephone is mounted to the first flap 5, while a receiver-side casing 60 of the portable mobile telephone is mounted to the second flap 6.

The hinge according to the first embodiment is assembled according to the following procedure.

Firstly, the bearing body 1 is assembled as described the above, and the slider 4 is inserted into the recess with the spring housing holes 20 of the shaft 2 with the pins 40, 40 extending into the coil springs 3. The shaft 2 in this state is forced into the bearing body 1, and the cap 13 is fitted over the outside end of the bearing body 1. The shaft 2 is inserted into the bearing body 1 until the holding projection 24 engages the step 12 thereby uniting the bearing body 1, the shaft 2, the coil springs 3 and the slider 4 into a single body.

The hinge in this state is supplied to a portable mobile telephone manufacturing factory. The hinge assembled as described the above is attached to the portable mobile telephone at the factory by inserting the bearing body 1 in the cylindrical part 5a of the first flap 5, while the flange 22 of the shaft 2 is placed in the cylindrical part 6a of the second flap 6.

In the hinge in the first embodiment, the slider 4 is pressed with the specified pressure by the coil springs 3 against the inner surface of the bearing body 1 in line-contact therewith as the second flap 6 is moved pivotally about the first flap 5, thereby braking the second flap 6. When the rounded surface of the slider 4 reaches the slider catch 10, the slider becomes held within the slider catch 10, and the second flap 6 is clicked to a stop in its pivotal motion. When the flap 6 is moved pivotally in the reverse direction with a force equal to or exceeding a specified force, the slider is released from the slider catch 10 thereby releasing the second flap 6 from its locked ("clicked") state. Then, the second flap 6 is free to move pivotally in the direction of restoration while being braked by the specified pressure until the rounded portion of the slider 4 becomes engaged within the opposite slider catch 10 for locking the second flap 6 relative to the first flap 5.

A first advantage of the hinge of the first embodiment is that frictional resistance to turning is provided by contact of the rounded surface of the slider 4 with the inner surface of the bearing body 1, with an increase in the length of the frictionally engaging surfaces. Thus, the hinge in the first embodiment utilizes the pressure of the coil springs 3 to more efficiently resist pivotal motion of the flaps.

Secondly, since in the first embodiment the coil springs 3 exert pressure against the inner surface of the bearing body 1 through the slider 4, there is an advantage to using a plurality of springs for an increase in braking force and clicking force.

Thirdly, since the rounded surface of the slider 4 and the inner surface of the bearing body 1 are axially in line-contact with each other, the sliding motion of the rounded surface of the slider 4 along the inner surface of the bearing body 1 becomes stable, and wear between the tip end of the rounded surface of the slider 4 and the inner surface of the bearing body 1 is restrained.

Fourthly, since the slider 4 carries pins 40 for guiding the coil springs 3, the operation of the coil springs 3 becomes more stable.

Fifthly, since the contacting surface of the slider 4 with the coil springs 3 is planar, the operation of the coil springs 3 becomes much more stable.

Second Embodiment

A second embodiment of the present invention will now be described with reference to FIG. 5.

Figure 5:
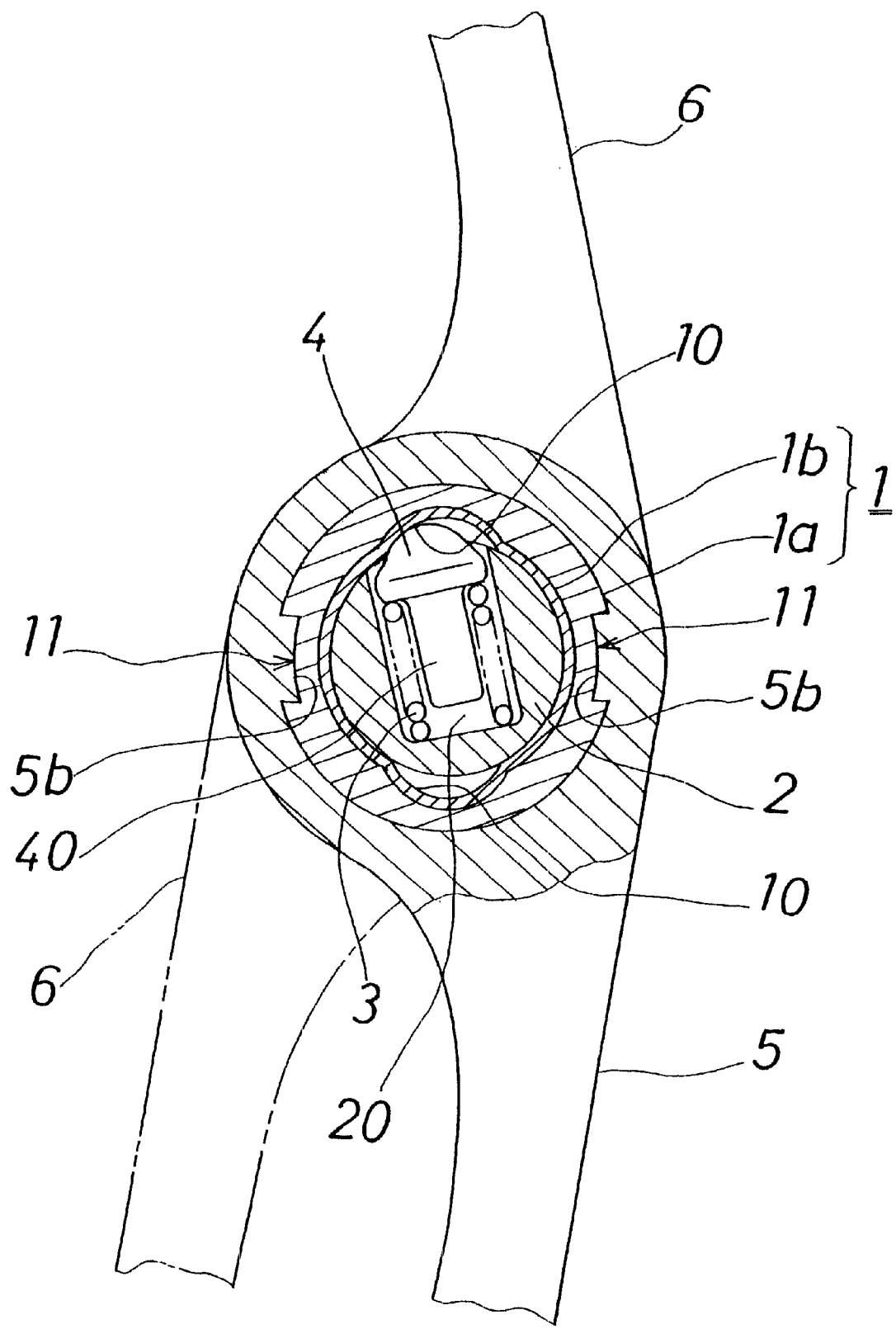
FIG. 5 is an exploded perspective view showing an essential part of a hinge of a second embodiment of the present invention.

FIG. 5 shows a folding portable mobile telephone including an appropriate stopper mechanism (not shown) for limiting the permissible pivotal motion of the second flap body 6 relative to the first flap 5 to a range (160 degrees) from the position shown by a solid line to the position shown by a chain double-dashed line.

In the portable mobile telephone of the second embodiment, it is preferable that slider catches 10, 10 of a greater width are formed at completely symmetrical positions on the inner surface of the bearing body 1 as shown in FIG. 5, so that the second flap 6 clicks into catches 10, 10 simultaneously with the first flap body 5 in operation of the stopper mechanism when a part of the tip end of the slider 4 makes contact with a side wall of a slider catch 10.

The adjustment of the click position and the operating position of the stopper mechanism are simplified, and the pair of slider catches 10, 10 formed at the completely symmetrical positions are better than those formed at an angular interval of 160 degrees from the viewpoint of ease of forming a small cylindrical interior sheet 1b.

Other features, operations and effects of the hinge of the second embodiment are similar to those of the hinge in the first embodiment and, hence, their description will be omitted.

Third Embodiment

Figure 6:
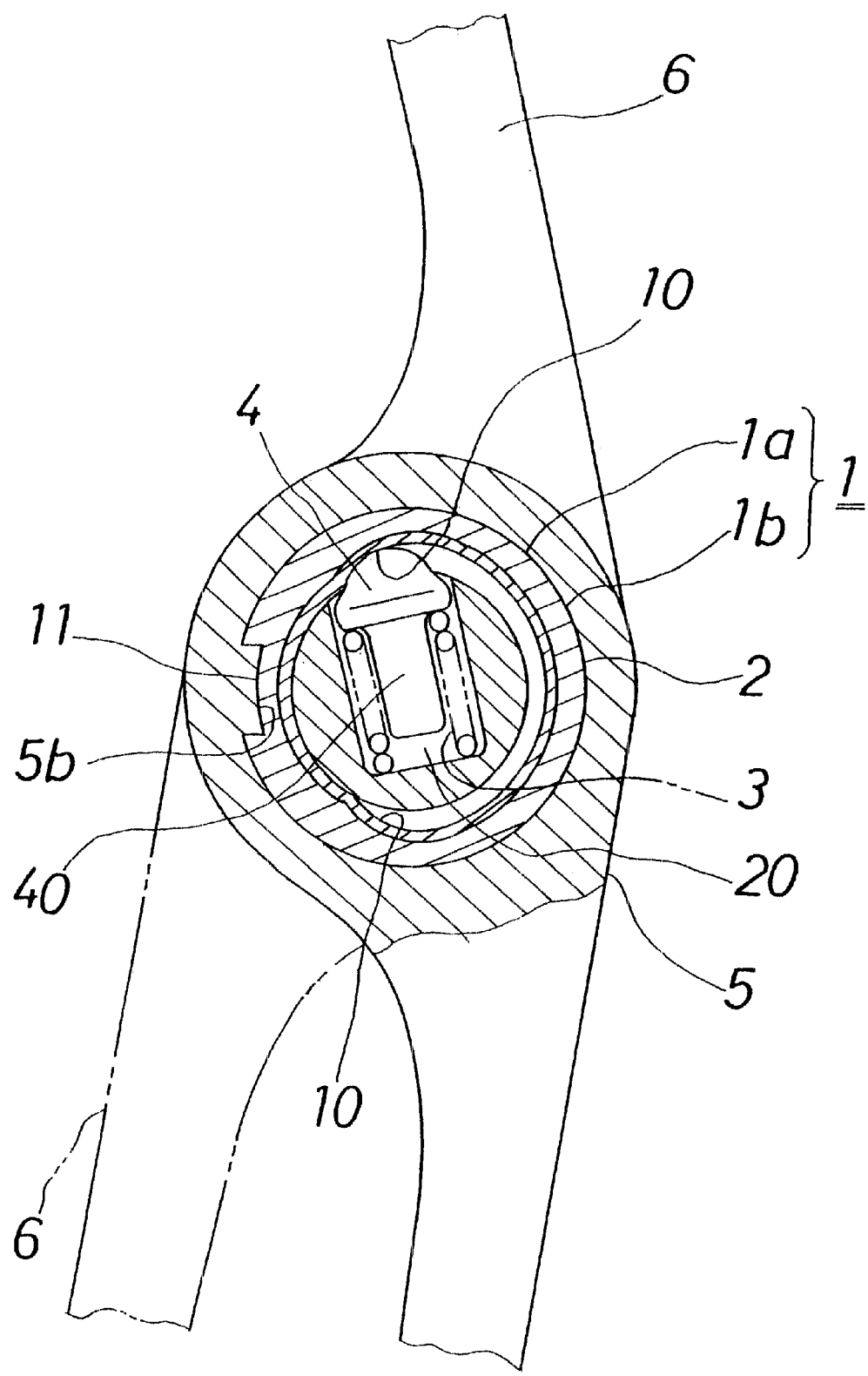
FIG. 6 is a sectional view of a hinge of a third embodiment of the present invention.

A third embodiment of the present invention will now be described with reference to FIG. 6.

In the hinge of the third embodiment, the groove-shaped slider catches 10, 10 of the hinge (See FIG. 5) of the second embodiment are modified into a circumferentially continuous shape in that portion which is outside the range of pivotal motion of the second flap 6.

The hinge of the third embodiment is operated similarly to the hinge of the second embodiment. Other features, operations and effects of the hinge of the third embodiment are similar to those of the hinge of the second embodiment, and hence, their description will be omitted.

Fourth Embodiment

Figure 7:
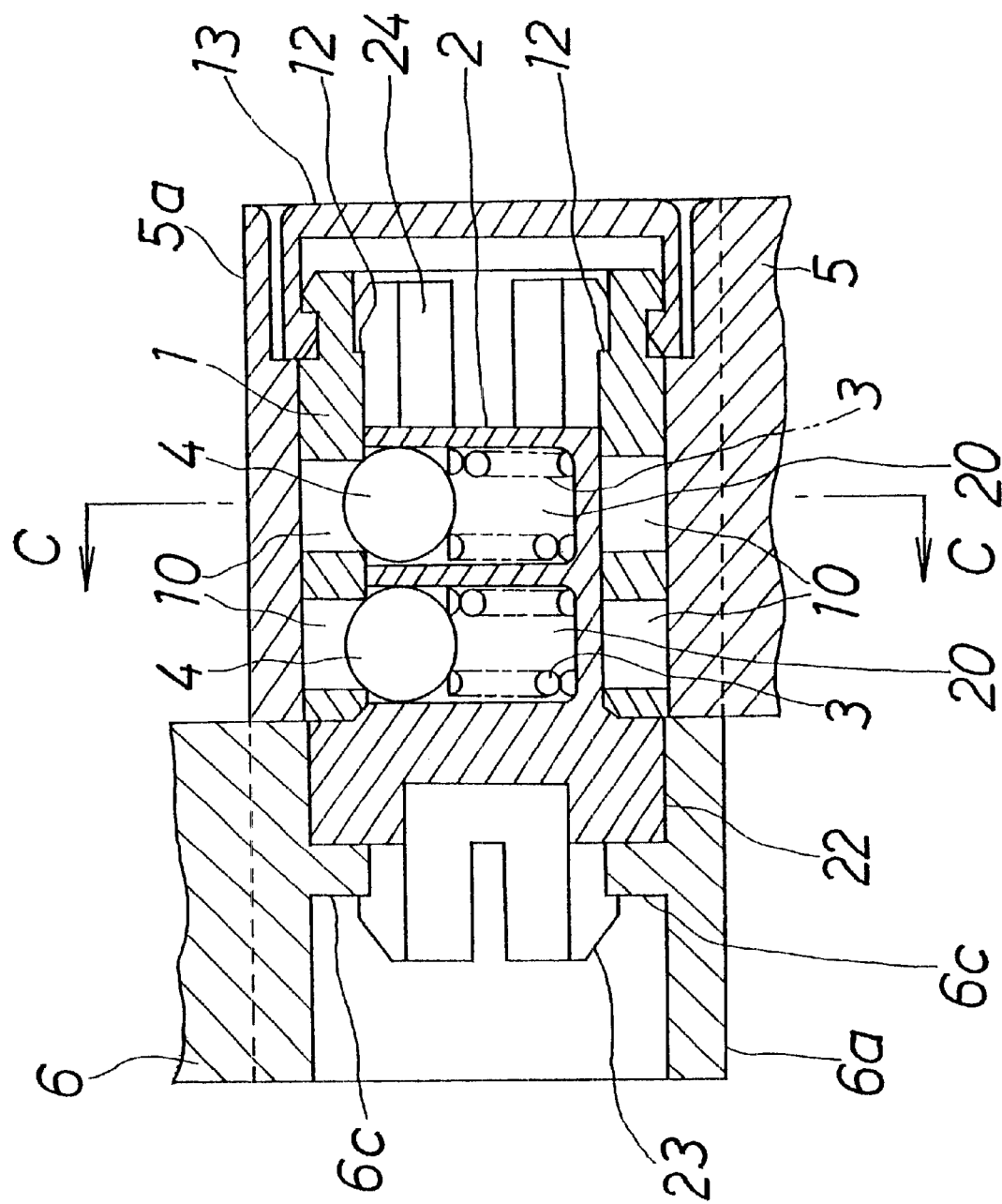
FIG. 7 is a sectional view of a hinge of a fourth embodiment of the present invention.
Figure 8:
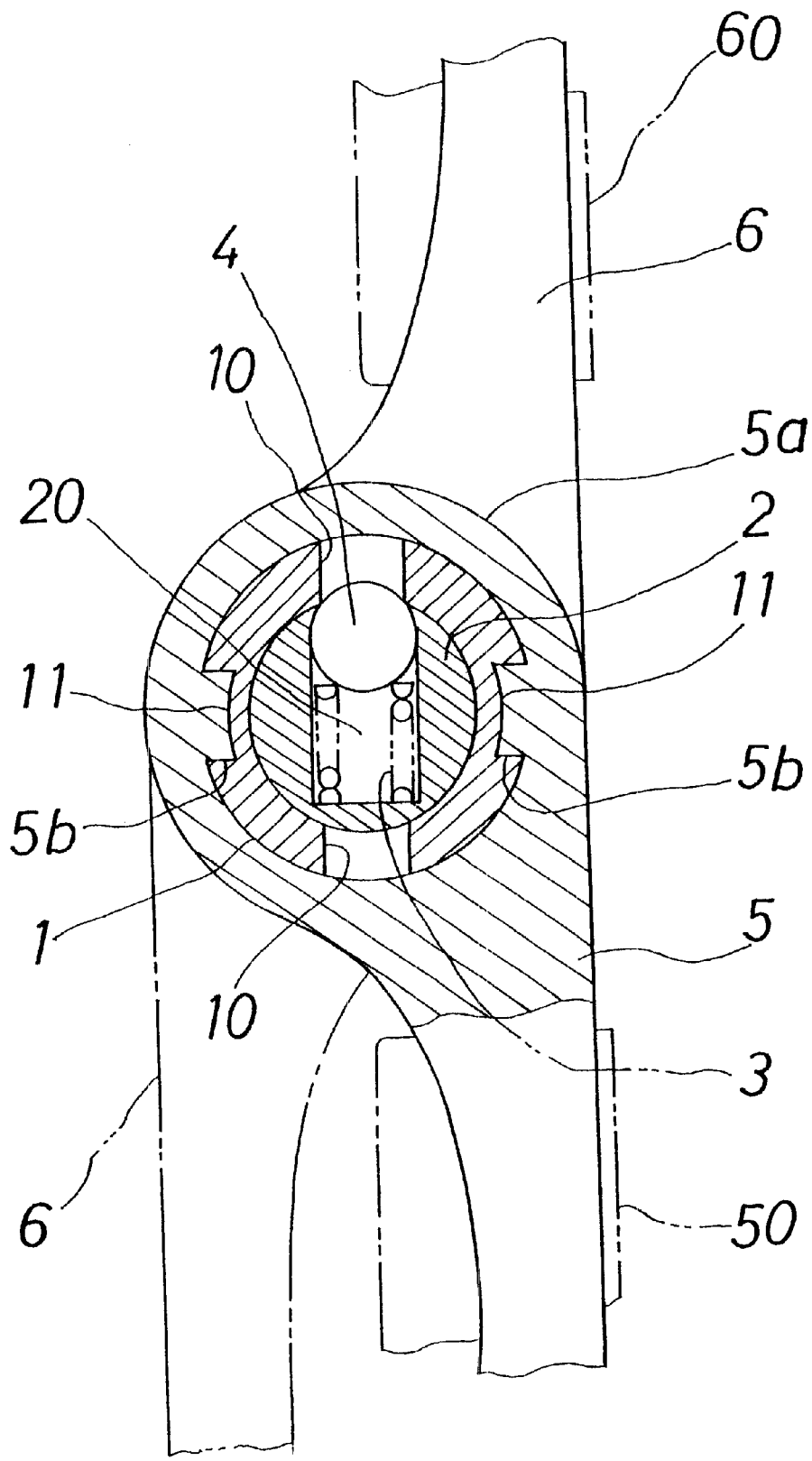
FIG. 8 is a sectional view taken along line C—C in FIG. 7.
Figure 9:
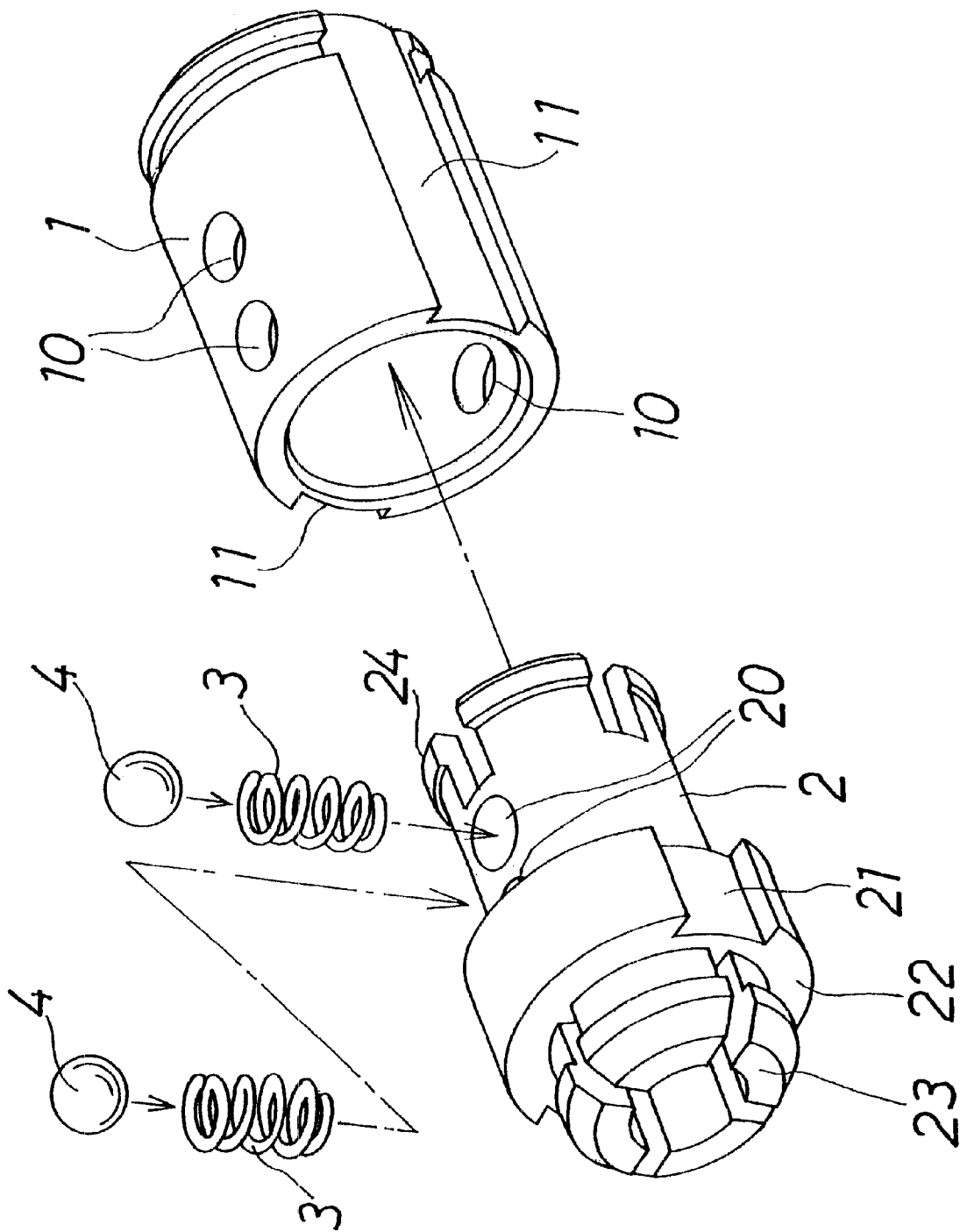
FIG. 9 is an exploded perspective view showing an essential part of the hinge in FIG. 7.

A fourth embodiment of the present invention will now be described with reference to FIGS. 7 to 9.

Reference numeral 1 denotes a bearing body made of metal such as steel or stainless steel and having, at its outer part, mounting for a first flap 5, and the bearing body 1 is formed in a cylindrical shape overall and is conductive. When steel is used for the material of the bearing body 1, a carbonitriding process is preferably employed to provide higher wear-resistance for the inner surface of the bearing body.

The inner surface of the bearing body 1 has slider holding holes 10, 10 (catches), which open radially outward and are slightly smaller in diameter than a ball slider 4, as will be described later, at positions spaced at an interval of a specified angle (180 degrees in this embodiment also) on the same circumference.

In the fourth embodiment, the slider holding holes 10, 10 are formed in two axially spaced locations.

Reference numeral 2 denotes a shaft made of synthetic resin having conductivity. One end of the shaft 2 has a flange 22, and the shaft is inserted into the bearing body 1 and held therein in a manner allowing relative turning.

The part of the shaft 2 inserted into the bearing body 1 has a spring housing hole 20 having one end opened to an outer surface so as to cross at a right angle with the shaft axis. The spring housing holes 20 are formed in two axially spaced parallel locations corresponding to the slider holding holes 10. A coil spring 3 (a piano wire is used in this embodiment) is housed in each spring housing hole 20. These coil springs 3 bias the steel ball sliders 4 out from the spring housing holes 20 in the direction of the circumference.

The hinge of the fourth embodiment is substantially similar in its other features to the hinge in the first embodiment.

The hinge of the fourth embodiment is assembled according to the following procedure.

Firstly, the coil springs 3 and the slider balls 4 are placed in the respective spring housing holes 20 of the shaft 2 and the shaft 2 in this state is forced into the bearing body 1, and the cap 13 is fitted on the outside end of the bearing 1. Since the tip end of the shaft 2 has the holding projection 24, the shaft 2 is held in the bearing body 1 in the press-fitted state. The holding projection 24 becomes held by the step 12 in the stage of completion of press-fitting of the shaft 2 in the bearing body 1, thereby uniting the bearing body 1, the shaft 2, the coil springs 3 and the sliders 4 into one body.

The hinge assembled as described the above is mounted on the portable mobile telephone by insertion of the bearing body 1 into the cylindrical part 5a of the first flap 5, while the flange 22 of the shaft 2 is placed in the cylindrical part 6a of the second flap 6.

According to the hinge in the fourth embodiment, since each ball slider 4 is pressed under a specified pressure by the coil spring against the inner surface of the bearing body 1 in point-contact therewith when the second flap 6 is pivoted about the first flap 5, the second flap is braked. When the slider balls 4 reach the slider catch 10, each slider ball 4 enters the slider catch 10 with a click, and the flap 6 is stopped in its pivotal motion. When the flap 6 is moved pivotally in the reverse direction by a specified force or more, each slider ball 4 is forced out of the slider catch 10 to release the second flap 6 from the locked or "clicked" state. Then, the flap 6 is free to move pivotally in the direction of restoration while being braked under the specified pressure until the slider balls 4 become engaged within the opposite slider catch 10.

The hinge in the fourth embodiment is slightly different from the hinge in the first embodiment in operation, including the motion of the sliders 4 along the inner surface of the bearing body 1 with point-contact. However, the hinge in the fourth embodiment is similar to the hinge in the first embodiment in advantages in that the length of the area of contact between the slider 4 and the bearing body 1 may be increased structurally to thereby utilize the elastic force of the coil spring in the direction of pivotal motion of the flap bodies more efficiently and a plurality of springs may be used for increase in braking force and "clicking" force.

In the hinge in the fourth embodiment, the pin for guiding the coil spring, alternatively, may be formed on the slider 4.

Fifth Embodiment

Figure 10:
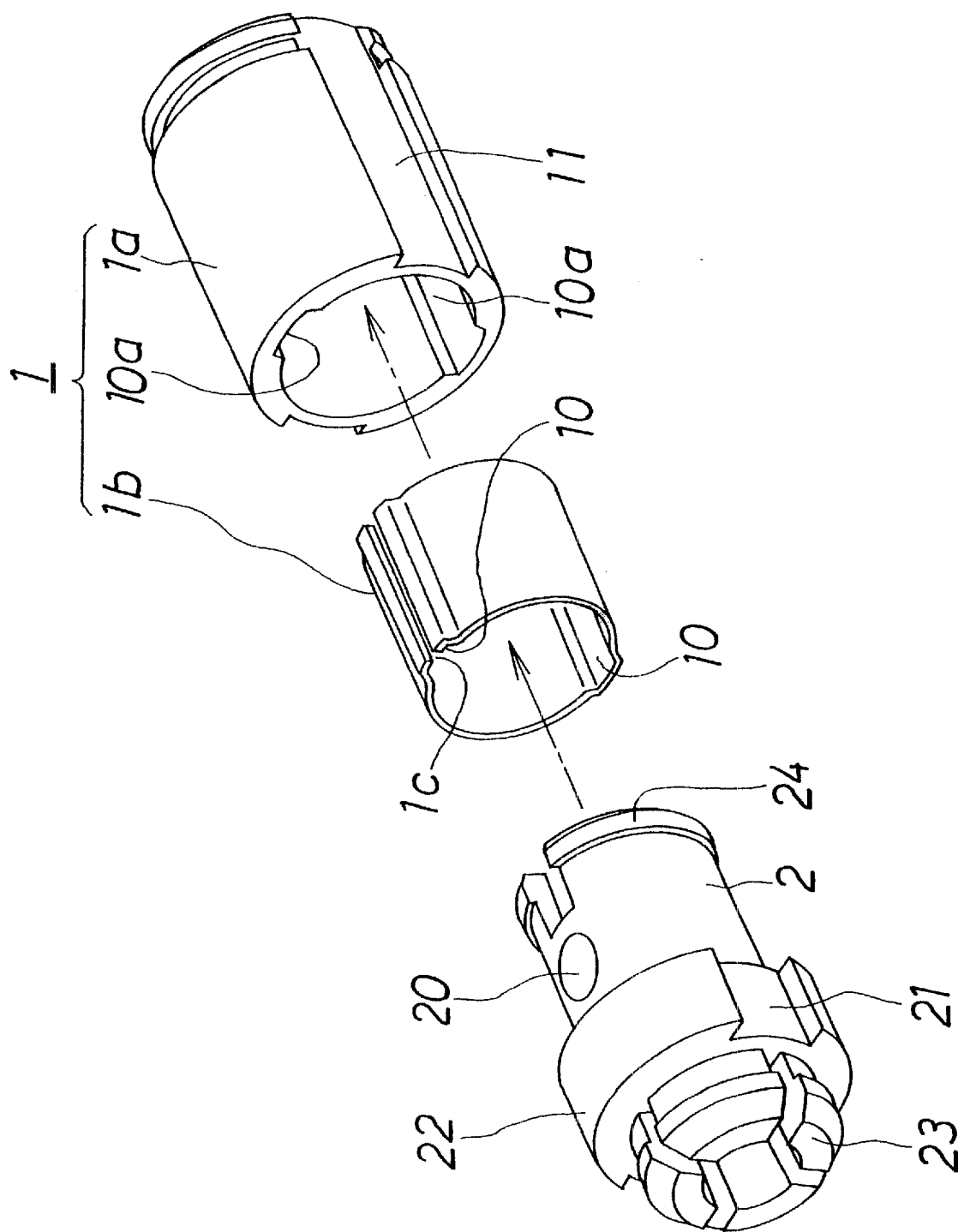
FIG. 10 is an exploded perspective view showing an essential part of a hinge of a fifth embodiment according to the present invention.
Figure 11:
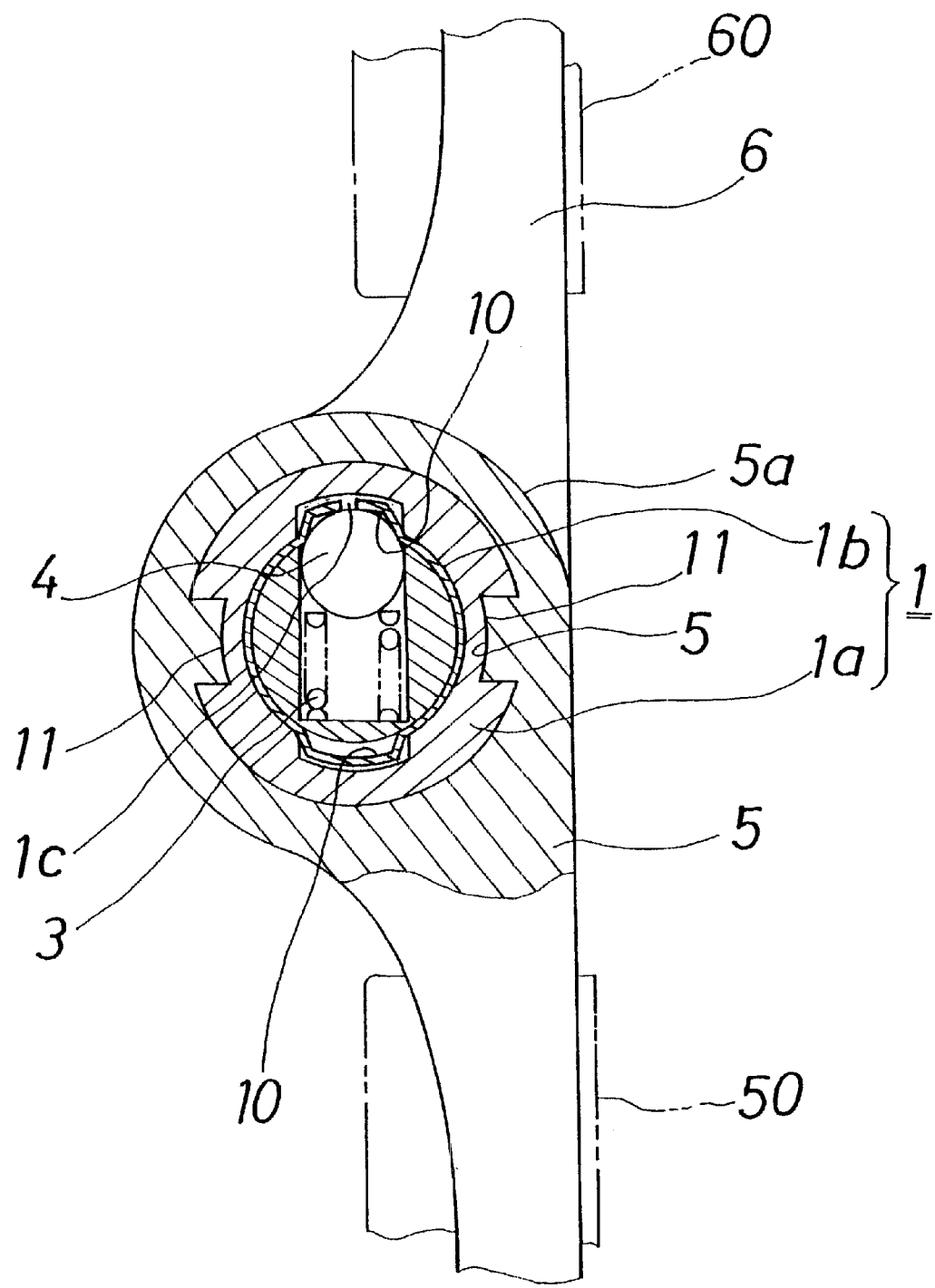
FIG. 11 is a sectional view showing an essential part of the hinge in FIG. 10.

A fifth embodiment of the present invention will now be described with reference to FIGS. 10 and 11.

The bearing body 1 is composed of a main body 1a made of synthetic resin having conductivity and an interior sheet 1b inserted into the main body 1a. The interior sheet 1b is an elastic metal sheet, such as a thin stainless steel sheet, formed in a substantially cylindrical shape with a slit 1c.

Each slider catch 10 is formed in the shape of an axial groove on the inner surface of the bearing body 1 and has a width slightly smaller than the diameter of the slider ball 4. The inner surface of the cylindrical body 1a has grooves 10a, 10a at positions corresponding to the slider catches 10 of the interior sheet 1b.

When a stainless steel sheet of a specified thickness or less is used for the material of the interior sheet 1b, the stainless steel sheet is preferably subjected to a carbonitriding process required to provide higher wear resistance.

One of the groove-shaped slider catches 10, 10 of the interior sheet 1b has the slit 1c, and the interior sheet 1b, when mounted inside of the body 1a, makes close contact with the body 1a through circumferential expansion due to its elasticity.

In the hinge in the fifth embodiment, when the second flap 6 is moved pivotally through 180 degrees about the first flap 5, the slider balls 4 enter the groove-shaped slider catch 10 with a click thereby locking the flap 6.

While the spring housing hole 20 of the shaft 2, the coil spring 3 and the slider 4 are respectively limited in number to one, it is to be understood that two sets of spring housing holes, coil springs and sliders may also be used, similar to the hinge of the fourth embodiment.

Other features, operations and effects of the hinge of the fifth embodiment are similar to those of the hinge of the fourth embodiment and, hence, their description will be omitted.

In the hinge in the fifth embodiment, the pin for guiding the coil spring 3 is externally fitted thereto but may alternatively be formed on the slider 4. Further, it is possible to operate the hinge of the fifth embodiment similar to the hinge of the second or third embodiment by setting the width of the groove as the slider catch 10 similar to that of the hinge of the second or third embodiment.

Sixth Embodiment

Figure 12:
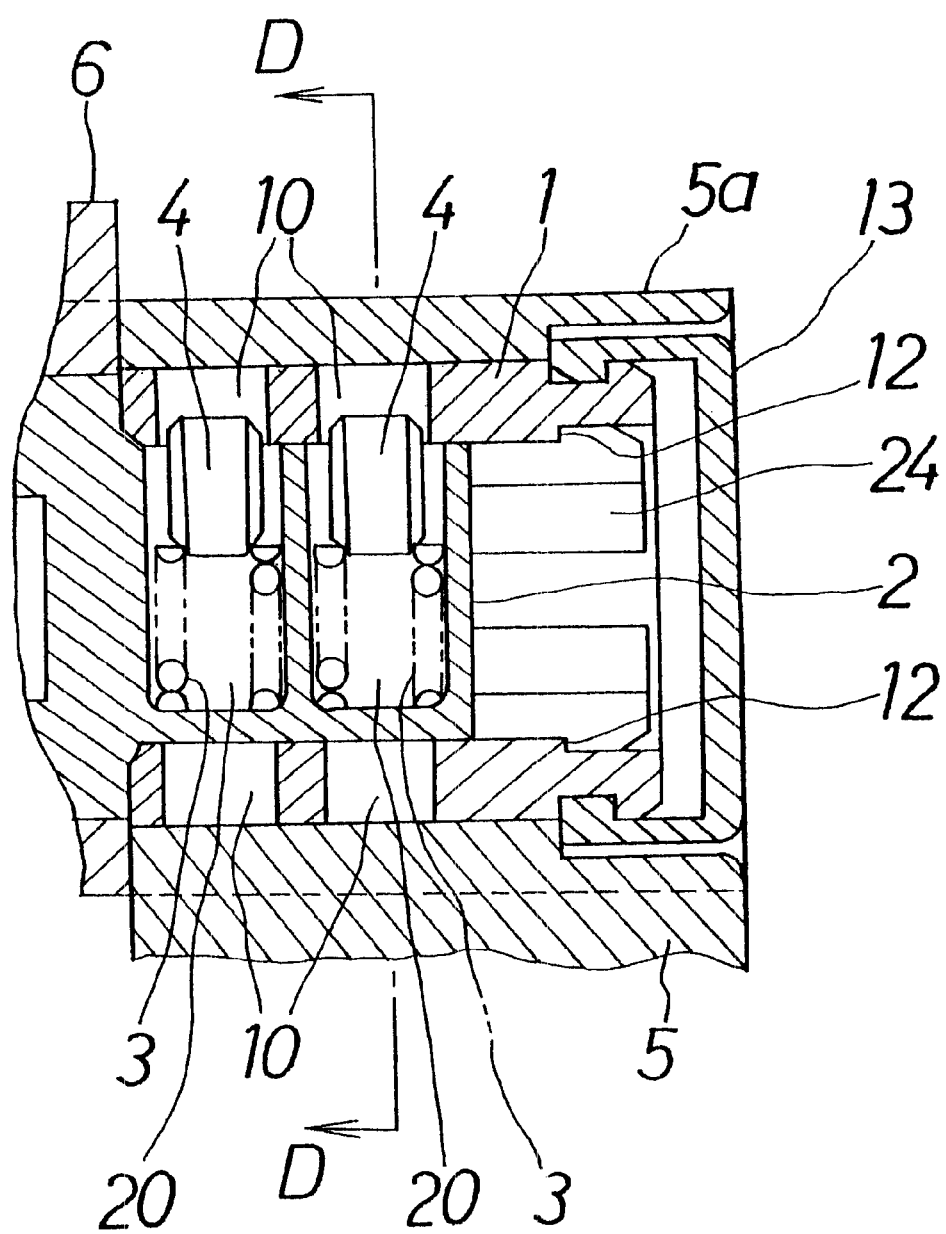
FIG. 12 is a sectional view showing a hinge of a sixth embodiment according to the present invention.
Figure 13:
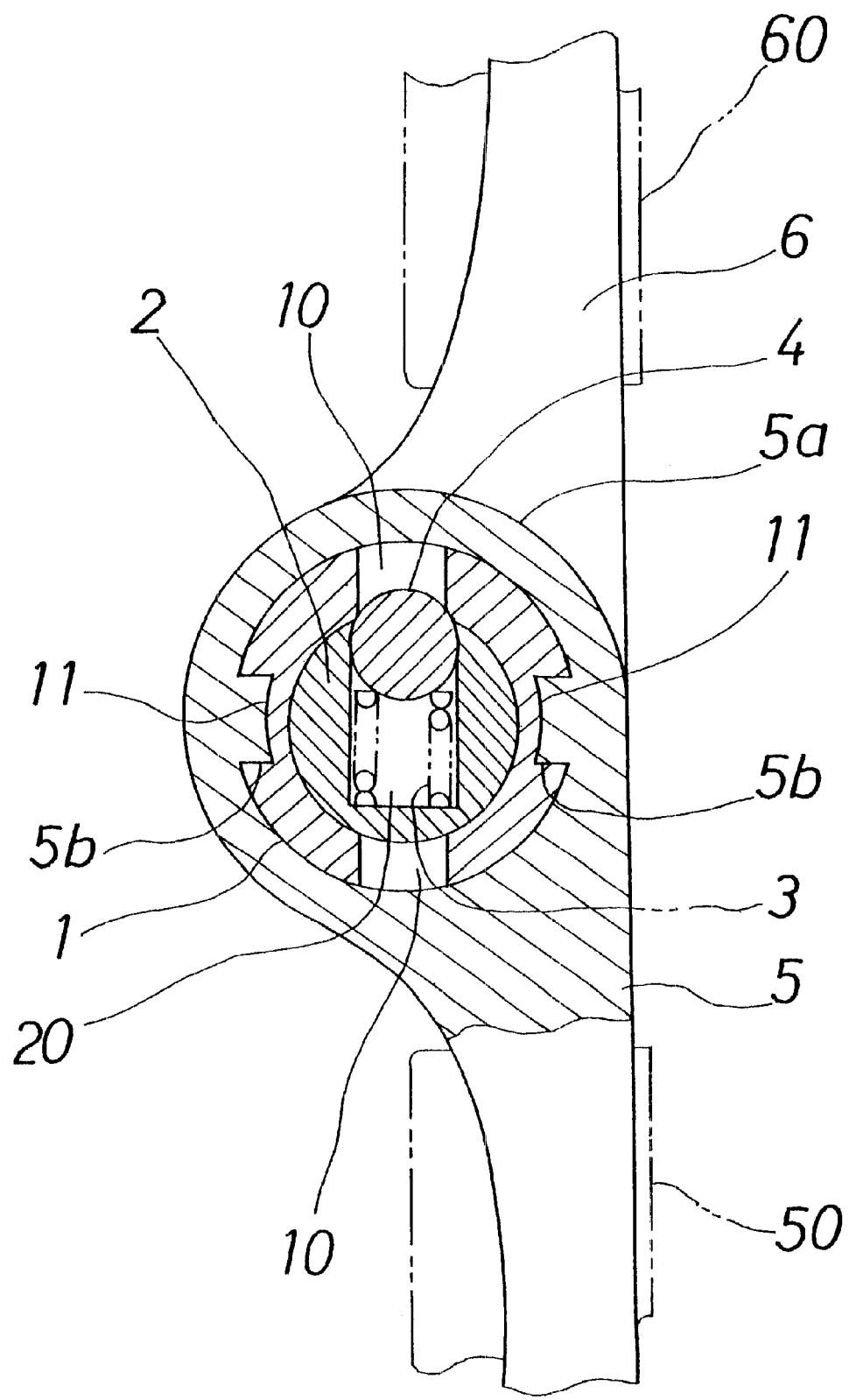
FIG. 13 is a sectional view taken along line D—D in FIG. 12.
Figure 14:
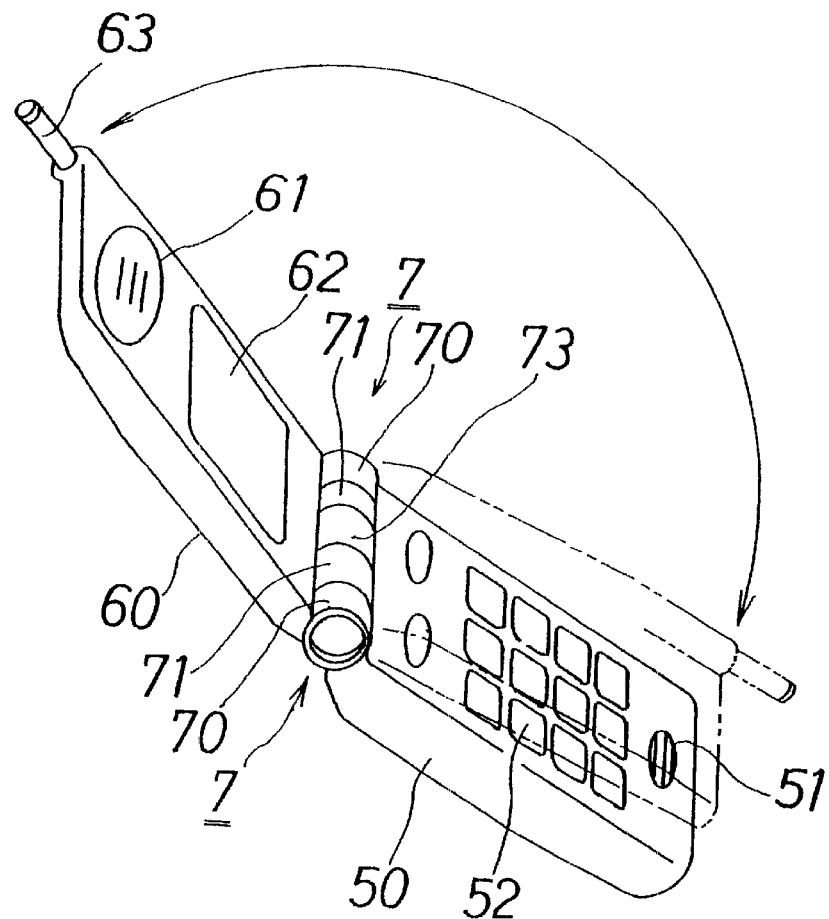
FIG. 14 is a perspective view showing a portable mobile telephone in the prior art.
Figure 15:
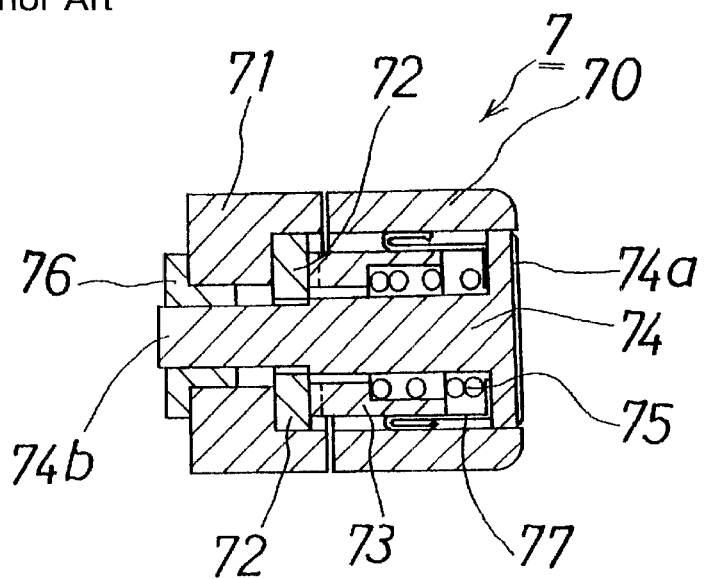
FIG. 15 is an enlarged sectional view showing a hinge used for the portable mobile telephone in FIG. 14.

A sixth embodiment of the present invention will now be described with reference to FIGS. 12 and 13.

The hinge of the sixth embodiment is substantially similar in basic structure to the hinge of the fourth embodiment, except that the slider 4 is formed as a roller (a cylindrical roller in this embodiment) made of steel or like hard material and having an axis placed in parallel to the axis of the shaft 2, instead of the ball.

The opposing circumferential edges of the slider 4 formed by the roller are chamfered sufficiently for the slider to smoothly slide along the inner surface of the bearing body 1.

The slider catch 10 is formed in the shape of a circular hole slightly smaller in diameter than the roller forming the slider 4.

Because the slider 4 is formed as a short cylindrical roller parallel to the axis of the shaft 2, the slider 4 and the inner surface of the bearing body 1 make line-contact with each other. Thus, the inner surface of the bearing body 1 suffers relatively less wear.

Other features, operations and effects of the hinge of the sixth embodiment are substantially similar to those of the hinge of the fourth embodiment and, hence, their description will be omitted.

In the hinge in the sixth embodiment, the slider catch 10 may be also formed in the shape of a groove similar to the fifth embodiment. Further, the pin for guiding the coil spring 3 may be also formed on the slider 4.

Other Embodiments

The slider 4 is not limited in shape to a rod having a substantially semicircular or conical section, to a ball or to a short roller as illustrated in the above embodiments. Thus, a slider of any other shape may be utilized, provided its tip end, the part which slides on the inner surface of the bearing body 1, has a semicircular section (a semicircular section crossing at right angles with the central axis of the shaft 2).

In case where holes serve as the slider catches 10 in the outer surface of the bearing body 1 with a ball or roller used as the slider 4, a slit-like hole formed axially in the bearing body 1 and having a width slightly smaller than the diameter of the slider 4 may be used, in place of the circular hole, in which case operation of the slider catch 10 and the slider 4 is substantially similar to that where the slider catch 10 is formed in the shape of a groove.

Any mounting parts 11, 21 permitting mounting of the bearing body 1 and the shaft 2 to the flaps may be used instead of the groove described above.

The angle of spacing of the slider catches 10 from each other on the same circumference is properly set according to the designed range of pivotal motion of the first flap 5 relative to the second flap 6.

According to the hinge of the present invention, the slider 4 and the inner surface of the bearing body 1, provide an increase in length of the frictionally engaging surfaces. Thus, in the hinge of the present invention the spring pressure in the direction of pivotal motion of the flaps is utilized more efficiently.

Further, since the hinge has the pressure of the coil spring 3 acting on the inner surface part of the bearing body 1 through the slider 4, there is an advantage to using a plurality of springs for further increase in braking force and locking or "clicking" force.

What is claimed is:

1. A hinge, comprising:

first and second flaps;

a bearing body having an exterior surface with mounting means for securing the first flap thereto, and a wear-resistant circumferentially shaped inner surface having slider catches at positions spaced by a predetermined angle and on the same circumference of the inner surface, said slider catches being formed in the shape of axial grooves having a concave semicircular section;

a shaft having, at one end thereof, mounting means for securing the second flap thereto, said shaft being inserted into said bearing body in a manner allowing relative turning, and said shaft having a plurality of spring housing holes, each opening at one end at an outer surface of said shaft and having a central axis crossing at a right angle with a longitudinal axis of said shaft;

coil springs respectively inserted into said spring housing holes; and a slider biased by said coil springs against the inner surface of said bearing body, and having wear-resistance at least at a tip end portion making contact with the inner surface of said bearing body, said slider having an axial length sufficient to extend across said spring housing holes and being capable of engagement within and disengagement from said slider catches as said shaft is turned relative to said bearing body, said slider having a semicircular section orthogonal to the length of the tip end portion, said tip end portion making line contact with the inner surface of said bearing body other than in said slider catches, said slider having, depending from a surface opposite said tip end portion, guide pins for said coil springs; and a recess in said shaft around said spring housing holes for retraction of said slider into the shaft.

2. A hinge according to claim 1, wherein said slider has a planar surface portion contacting one end of each of said coil springs.

3. A hinge according to claim 1, wherein said bearing body comprises a synthetic resin body and a metal interior sheet fixed to an inner surface of said resin body.

4. A hinge according to claim 2, wherein said bearing body comprises a synthetic resin body and a metal interior sheet fixed to an inner surface of said resin body.

5. A hinge according to claim 1, wherein a transmitter-side casing of a portable mobile telephone is fixed to one of said first and second flaps, and a receiver-aide casing of the portable mobile telephone is fixed to the other flap, and wherein said bearing body and said shaft are conductive.

6. A hinge according to claim 2, wherein a transmitter-side casing of a portable mobile telephone is fixed to one of said first and second flaps, and a receiver-aide casing of the portable mobile telephone is fixed to the other flap, and wherein said bearing body and said shaft are conductive.

7. A hinge according to claim 3, wherein a transmitter-side casing of a portable mobile telephone is fixed to one of said first and second flaps, and a receiver-aide casing of the portable mobile telephone is fixed to the other flap, and wherein said bearing body and said shaft are conductive.

* * * * *

UNITED STATES PATENT AND TRADEMARK OFFICE
CERTIFICATE OF CORRECTION

PATENT NO. : 6,609,273 B1
DATED : August 26, 2003
INVENTOR(S) : Yamada et al.

It is certified that error appears in the above-identified patent and that said Letters Patent is hereby corrected as shown below:

<u>Title page,</u>
Item [86], PCT No.: "371(c)(1), (2), (4) Date: Apr. 14, 2002" should read
-- 371(c)(1), (2), (4) Date: Jan. 14, 2002 --.

Signed and Sealed this

Twenty-fifth Day of May, 2004

JON W. DUDAS
*Acting Director of the United States Patent and Trademark Office*